(12) United States Patent
Paronen

(10) Patent No.: US 6,902,849 B2
(45) Date of Patent: Jun. 7, 2005

(54) POLYMER MEMBRANE AND A PROCESS FOR THE PRODUCTION THEREOF

(76) Inventor: Mikael Paronen, Nuottaniementie 3 A 2, FIN-02230 Espoo (FI)

(*) Notice: Subject to any disclaimer, the term of this patent is extended or adjusted under 35 U.S.C. 154(b) by 123 days.

(21) Appl. No.: 10/602,652

(22) Filed: Jun. 25, 2003

(65) Prior Publication Data

US 2004/0086764 A1 May 6, 2004

Related U.S. Application Data

(62) Division of application No. 09/890,825, filed as application No. PCT/FI00/00117 on Feb. 16, 2000, now Pat. No. 6,630,518.

(30) Foreign Application Priority Data

Feb. 16, 1999 (FI) .................................................. 990324

(51) Int. Cl.[7] .................................................. H01M 6/14
(52) U.S. Cl. ........................ 429/314; 429/12; 429/129
(58) Field of Search ........................... 429/314, 12, 129

(56) References Cited

U.S. PATENT DOCUMENTS

| | | | |
|---|---|---|---|
| 3,925,332 A | 12/1975 | Naito et al. | |
| 4,012,303 A | 3/1977 | D'Agostino et al. | |
| 4,409,339 A | 10/1983 | Matsuda et al. | |
| 4,420,612 A | 12/1983 | Aiba et al. | |
| 6,214,891 B1 | 4/2001 | Schneller et al. | |
| 6,225,368 B1 | 5/2001 | D'Agostino et al. | |

FOREIGN PATENT DOCUMENTS

| | | |
|---|---|---|
| GB | 2330836 | 5/1999 |
| JP | 52156790 | 12/1977 |
| JP | 59038242 | 3/1984 |
| JP | 60055033 | 3/1985 |
| JP | 8239494 | 9/1996 |
| JP | 11116679 | 4/1999 |
| WO | WO9711989 | 4/1997 |
| WO | WO 9726284 | 7/1997 |

OTHER PUBLICATIONS

Savadogo, *J. of New Materials for Electrochemical Systems*, 1:47–66 (1998).

Lehtinen et al, *Electrochimica Acta*, 43(12–13):1881–1890 (1998).

Paronen et al, *J. Mater. Chem.*, 7(12):2401–2406 (1997).

Brack et al, *Poly. Mater. Sci. Eng.*, 77:368–369 (1997).

Paronen et al, *J. of Appl. Polymer Sci.*, 73:1273–1284 (1999).

*Primary Examiner*—Morton Foelak
(74) *Attorney, Agent, or Firm*—Sughrue Mion, PLLC

(57) ABSTRACT

The present invention relates to a sulfonated polymer membrane and to a process for the preparation thereof. According to the process, a polymer film is irradiated, and the irradiated polymer film is sulfonated in order to link sulfonic acid groups thereto. According to the invention, the sulfonation is continued until the total concentration of sulfonic acid groups in the membrane is 0.4–3.0 meq/g and they are homogeneously distributed in the membrane material in such a manner that their concentration in the middle of the membrane is at minimum 0.2 meq/g. With the help of the invention, it is possible by a rapid and simple process to prepare membranes the chemical and mechanical properties of which can be regulated by means of the selection of the initial film, by irradiation and by the sulfonation process.

1 Claim, 1 Drawing Sheet

POLYMER MEMBRANE AND A PROCESS FOR THE PRODUCTION THEREOF

Figure 1:
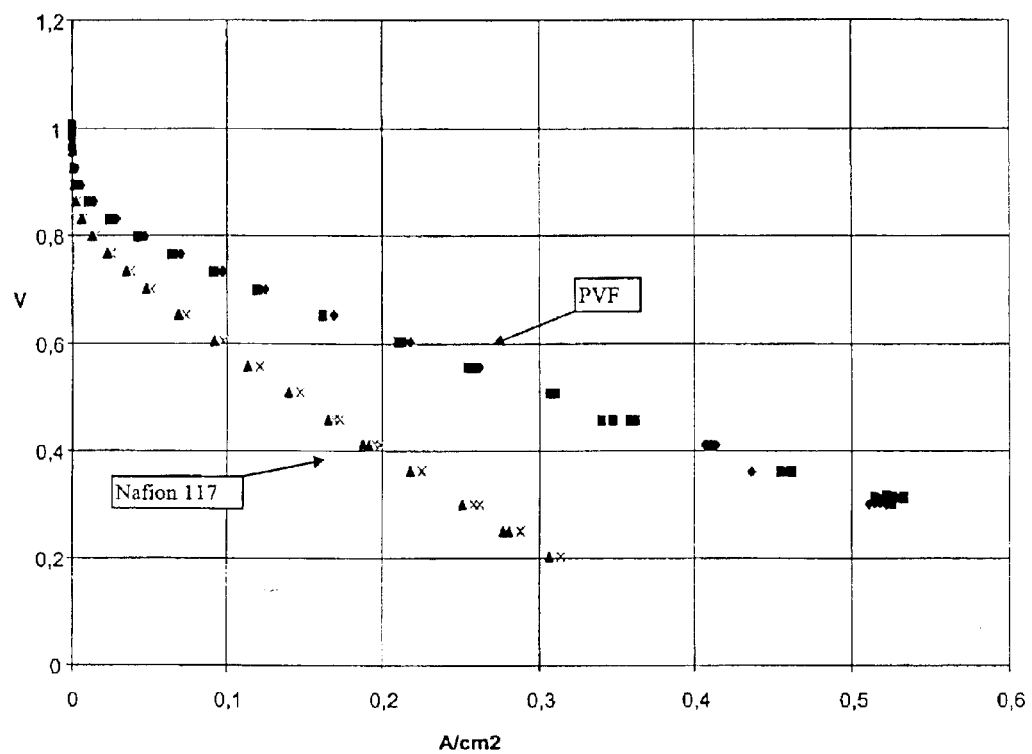

This application is Divisional of U.S. application Ser. No. 09/890,825, filed Sep. 17, 2001 (now U.S. Pat. No. 6,630,518); which is a 371 of PCT/FI00/00117 filed Feb. 16, 2000; the disclosure of each of which is incorporated herein by reference.

Conductivity is one of the most essential properties in any application of a membrane such as the membrane according to the present invention. The membranes are also required to have mechanical strength, chemical stability, and good barrier properties against the permeation of non-desirable components from one side of the membrane to the other.

Ion-conductive membranes can be used in numerous applications. Some examples are their use as proton conductors in fuel cells or electrolytic cells. In a fuel cell, the energy released in the reaction is converted to electric current at a conversion rate of approximately 60–80%. Fuels suitable for such cells include hydrogen, natural gas and methanol. Fuel cells which have polymer membranes as electrolytes are regarded as one of the most interesting options for relatively small-scale energy production applications in which the power source is less than 150 kW. Such applications include vehicles and certain electric appliances.

At present, many polymer membranes are known which are suitable for use for the purposes mentioned above. In the state of the art (compiled in the work Davis, T. A., Genders, J. D. and Pletcher, D., *A First Course in Ion Permeable Membranes*, pp. 35–57), two principal preparation processes are disclosed, of which, of course, several variations have been developed.

In the first prior art process, an unsubstituted alkene is copolymerized with a functionalized alkene which contains ionizable groups or, more probably, precursors of ionizable groups. It has been observed that perfluorinated membranes have the best properties in particular as regards stability and the chemical and physical properties. The first step in the preparation of a membrane such as this is monomer synthesis, whereupon the result obtained is a perfluorinated, substituted alkene having an ion-exchange group at the end of a side chain. Sulfonate or carboxylate groups are used commercially. The length of the side chain usually varies from 1 to 4 carbon atoms. This ionomer is thereafter copolymerized with polytetrafluoroethylene (PTFE). PTFE forms the backbone in almost all membranes prepared by the technique described above. The polymer is brought to film form before the conversion of the precursors to ion-exchange active groups.

According to another prior art process, the alkene is polymerized, whereafter ion groups are introduced into the polymer. Usually the membranes prepared in this manner are based on copolymers of styrene and divinyl benzene. There are numerous different alternative embodiments, for example, it is possible to irradiate a stable, inert polymer in order to enable this polymer to be grafted with some aromatic polymer. Ion-exchange groups, which become linked to the aromatic ring, are usually introduced into the structure by means of a strong sulfuric acid solution.

Furthermore, there are a number of membranes of special production, the best known of them being probably Gore Select. It is based on filling the pores of a material like Gore Tex, known as a weatherproof material and being based on PTFE material, with a ion-exchange active polymer, such as commercial Nafion®. The conductivity of Gore Select is, of course, not in the order of that of Nafion®.

The performance of membranes according to the first technique, one example being specifically Nafion®, is quite fair. The problem involved with these membranes is their difficult preparation process. For this reason the price of the product remains high and the amounts used remain low. It is also to be noted that the properties of the membrane are largely determined already during the monomer stage, and thus the modification of the properties in membrane form is nearly impossible. The processing of the membrane is also cumbersome. On the other hand, membranes prepared by the grafting process are seldom chemically resistant.

In prior art there is also disclosed a process in which reactive sites are provided in a polyvinyl fluoride film (PVF film) by electron or proton irradiation (Paronen, M., Sundholm, F., Rauhala, E., Lehtinen, T. and Hietala, S., Effects of Irradiation on Sulfonation of Poly(vinyl fluoride), *J. Mater. Chem.*, 1997, 7(12), 2401–2406). An irradiated film was treated with chlorosulfonic acid having a concentration of 2.5% by volume. It is noted in the publication that both the absorbed radiation dose and the mass of the irradiating particle affect the sulfonation. The conductivity of proton-irradiated membranes was at best 10–20 mS/cm when the absorbed doses were 400–1000 kGy. However, the distribution of sulfonic acid groups in the membrane is not discussed in the publication. Furthermore, it was observed in laboratory experiments that the membranes according to the publication, when treated, were not self-supporting or their conductivity was very low.

The object of the present invention is to eliminate the disadvantages associated with prior art and to provide a new process for the preparation of sulfonated polymer membranes.

According to the invention, a polymer film is irradiated with ions or gamma radiation in order to produce reactive sites. The irradiated membrane material is sulfonated in order to link sulfonic acid groups to it. The sulfonation is continued until the total concentration of sulfonic acid groups in the membrane is 0.4–3.0 meq/g and they are homogeneously distributed in the membrane in such a manner that their concentration in the middle of the membrane is at least 0.2 meq/g.

By the process according to the invention it is possible to prepare a membrane in which the sulfonic acid groups are linked directly to the repeating unit of the polymer chain and not to a side chain as in prior-art options, when the membrane material is non-aromatic.

More specifically, the process according to the invention is characterized by what is stated in the characterizing part of Claim 1.

The membrane according to the invention, for its part, is characterized by what is stated in the characterizing part of Claim 12.

The electrochemical cell according to the invention is characterized by what is stated in the characterizing part of Claim 19.

Considerable advantages are achieved by means of the invention. By the process according to the invention, a membrane is obtained which is self-supporting and which can be used in various applications, such as fuel cells. The membrane can also be used as an ion-exchange active material in ion exchange, in the coating of material, in ion-selective purification, in applications exploiting filter or separator membranes, or in applications exploiting semi-permeable membranes. The homogeneous distribution of the sulfonic acid groups in such a manner that their concentration in the middle of the membrane is above 0.2 meq/g ensures that conductivity will not decrease too much. On the other hand, the homogeneous distribution of sulfonic acid groups in the membrane improves the mechanical properties of the membrane as compared with a situation in which the sulfonic acid groups are mainly located on the membrane surface.

By the process according to the invention it is possible to prepare, by a rapid and simple process, membranes the chemical and mechanical properties of which can be regulated by the selection of the starting membrane, by irradiation and by the sulfonation process. Owing to the simple process, the production costs are also much lower, and thus the selling price of the membrane is also significantly lower. This is of special significance considering the use of the electrochemical cell according to the invention, in particular a fuel cell, as a source of energy. Prior art membranes are so expensive that their use, for example, in cells intended for sources of energy for automobiles would considerably increase the costs of manufacture of automobiles. The best known and most researched membrane on the market for the fuel cell application is Nafion®. The price of Nafion® per square meter is, however, so high that the use of a fuel cell as the source of energy would almost double the automobile manufacturing costs.

Compared with the technology of prior art, the special feature of the membrane material is that the sulfonic acid groups are linked directly to the linear carbon backbone of the polymer chain and not to the end of a side chain. In other words, the sulfonic acid groups are linked to a polymer chain carbon atom which, together with the other carbon atoms, forms the carbon backbone of the polymer chain. Through this, the advantage is gained that a greater crystallinity of the material is made possible, in which case the density of the material is higher and its macro structure more rigid. From these, it follows that the permeability of the membrane is lower, its solubility is lower, and its dimensional stability is better.

The invention is discussed below with the help of the accompanying drawing. The figure shows the polarization curves of a commercial material and a membrane according to the invention in a fuel cell test.

In order that the product should have the desired mechanical and chemical properties, the membrane material must be selected with these factors in mind. The membrane material should be such that irradiation will cause a change which promotes functionalisation, and it should be sufficiently sensitive to irradiation. Thus, according to the first preferred embodiment of the invention, the membrane material used is a non-aromatic polymer. In the context of the present invention, "non-aromatic" means that the material consists mainly of non-aromatic units. Possibly the material may, however, contain aromatic groups, but so that the presence of the aromatic groups will not substantially affect the irradiation. According to another preferred embodiment of the invention, the membrane material used is an aromatic polymer.

It is important that, before treatment, the membrane material is sufficiently tough and strong and that it is chemically resistant. In particular, because of the applications, the mechanical strength and self-supporting quality of the membrane material even after treatment is to be taken into account. By self-supporting quality is meant here not only the capability of the membrane material to cohere without support but also that it must withstand the strain caused by the various uses, in other words, that it will not crumble, crack or break even when acted upon by relatively small, partly non-homogeneous forces. For example, in a fuel cell the gas diffusion electrodes creep, whereupon the ion-exchange membrane is subjected to non-homogeneous forces. The self-supporting membrane according to the invention withstands these forces.

The permeability of the membrane material is especially important in a fuel cell application, in which case the permeability must be sufficiently low in order to prevent the permeation of the fuel from one side of the membrane to the other. Thus, in the present invention, membranes are preferably made from materials which are not substantially porous.

The most preferable of the non-aromatic materials which fulfill the above-mentioned requirements is polyvinyl fluoride (PVF). Other especially suitable materials include other fluorinated materials such as polyhexafluoropropylene, polychlorotrifluoroethylene, polytetrafluoroethylene (PTFE) and polyvinylene fluoride (PVDF). Polyethylene (PE) and polypropylene (PP) can also be used. In addition, it is possible to use mutual copolymers or blends of any of the above-mentioned polymers. It is also possible to use a copolymer or blend of any polymer of the group with a polymer selected from outside the group.

The aromatic membrane material is selected from a group which includes polyesters, polysulfones, polyphenylene sulfides, polyketones, polyether sulfones, polybenzimidazoles, polyimides, polyetherether ketones and polyarylether sulfones. Preferably polyimide is used. In addition, it is possible to use mutual copolymers, graft polymers or blends of any of the above-mentioned polymers. It is also possible to use a copolymer, graft polymer or blend of any one or several of the polymers with a polymer or polymers selected from outside the group. By blends is meant here both homogeneous and micro- or macro-phase separated blends. Sandwich-structured materials can also be used.

Alternatively, the membrane material used may also be a multiple-layer film. In this case the membrane material is made up of at least two layers which may be mutually of the same material or of different materials selected from the group including the materials listed in the preceding paragraph. However, the materials must be compatible in such a manner that they can be processed at an elevated temperature, i.e. be hot pressed, glued or otherwise joined tightly together. Preferably these materials are selected so that the film layers with a higher chemical resistance (e.g. PTFE) are placed outermost and the most readily sulfoning film layers in the middle. One preferred option is to place PTFE layers outermost and a PE layer between them.

The membrane material is irradiated with ion or gamma radiation. Irradiation causes in the material a change which controls the sulfonation position, either directly through the reaction product or through a change in crystallinity. The irradiation speed should be such that it does not cause excessive heating up of the film being irradiated. The radiation dose (absorbed dose) is typically 50–1500 kGy. The irradiation time depends largely on the thickness of the film being irradiated and on the apparatus used, and thus the time consumed by the providing of the desired absorbed dose varies greatly. The irradiation is carried out while the film is in an inert atmosphere or a vacuum. After the irradiation the film is stored preferably in substantially oxygen-free conditions until its sulfonation.

By ion irradiation, a linear track of reaction products and structural changes is produced. In ion irradiation it is possible to use, for example, any of the following ions: $H^+$, $He^+$, $He^{2+}$, $Li^+$, $Li^{2+}$, $Li^{3+}$. In ion irradiation, radiation absorption forms a linear track across the film, whereupon a passage of an amorphous phase is formed across the film. The sulfonation reaction is more rapid in the amorphous phase. Thus a site-selective and more rapid sulfonation is achieved. Under the effect of ion irradiation, micropores are formed in the membrane material. The sulfonic acid groups also attach to the walls of the micropores.

In gamma radiation, the irradiation time is quite long; it may be up to 10 days. It should, however, be noted that by gamma radiation it is possible to treat considerably thicker samples than by, for example, conventional electron irradiation. The use of gamma irradiation is based on the fact that it increases crystallinity and cross-linking. When crystallinity increases, sulfonation is directed to the amorphous phase.

The relatively even distribution of sulfonic acids or their derivatives in the film relative to the cross-section of the membrane is essential in sulfonation. According to the invention, the concentration of sulfonic acid groups in the middle of the membrane is at minimum 0.2 meq/g, which ensures that conductivity will not decrease too much because of a less conductive middle area. Preferably the concentration of acid groups in the middle of the membrane is at minimum 0.4 meq/g. The concentration of sulfonic acid groups quite on the surface of the membrane may vary widely. At their highest the concentrations may be up to approximately 7–10 meq/g, but when the topmost surface layer is not taken into account, the concentration in the vicinity of the surface is typically 1–3 meq/g.

Another important quantity is sufficient total sulfonation degree, since the total sulfonation degree is in practice the same as the ion exchange capacity; sulfonic acid groups are specifically ion-exchange active groups. The total concentration of sulfonic acid groups in the membrane is 0.4–3.0 meq/g, preferably 0.5–1.5 meq/g. If the total concentration in the membrane is lower than 0.4 meq/g, the conductivity of the membrane is low. On the other hand, if the concentration of sulfonic acid groups in the membrane exceeds 3 meq/g, the structure begins to dissolve in water or the membrane begins to lose its mechanical strength.

The sulfonation, which is preferably carried out at minimum 10 minutes after the irradiation, can be carried out either as solution sulfonation or as gas-phase sulfonation. In each case, the sulfonation is carried out in substantially oxygen-free conditions. By this is meant that oxygen is present in so small an amount that secondary reactions detrimental to sulfonation are not started. Thus the processing takes place in the presence of an inert gas (e.g. $N_2$).

In gas phase sulfonation the reagent is a sulfur compound which is in the gas phase at the sulfonation temperature. For example, it is possible to use oleum, chlorosulfonic acid, sulfur dioxide ($SO_2$) or sulfur trioxide ($SO_3$). The sulfonation is carried out in a pressure-resistant container, in which the gas-forming reagent is placed first or it is fed into the container after the irradiated film has been placed in the container. The pressure in the container is approximately 0.5–20 bar, preferably 0.5–1.5 bar, and it is regulated by means of an inert gas. The temperature in the container is approximately 0° C. The time consumed by the gas sulfonation varies according to the film thickness and the desired degree of sulfonation; typically it is approximately from 15 minutes to 3 hours.

In solution sulfonation it has been observed in connection with the present invention that, when dilute sulfonation solutions are used, i.e. when the concentration of the sulfonation reagent in the solution is low, a relatively even sulfonation relative to the cross-section of the film is attained. The concentration of the solution is preferably 0.1–1.5% by volume, especially preferably 0.5–1.5% by volume. In solution sulfonation, there is preferably used chlorosulfonic acid dissolved in some chlorinated hydrocarbon, which may be, for example, dichloroethane.

The sulfonation temperature is preferably between 0° C. and 25° C. The sulfonation is typically carried out at room temperature. In this case the sulfonation time is approximately 0.5–2 h. It is also possible to operate at a lowered temperature. The reaction rate of sulfonation at 0° C. is, however, very low and, thus, the sulfonation is preferably carried out by allowing the film to stand at a lowered temperature in order to cause the sulfonic acid to diffuse into the film, and by raising the temperature after approximately 1–2 h, whereupon the reaction starts properly.

After both gas sulfonation and solution sulfonation the membrane must be cleaned in order to remove the water-soluble polymer and the free acid present in the membrane. Suitable cleaning methods include, for example, evaporation, which can be carried out under normal pressure or under a reduced pressure, and a multiple-step cleaning, which can be carried out in part or entirely under pressurized conditions or under normal pressure. Preferably these methods are used combined.

According to one preferred embodiment, the membrane is first washed with a solvent of the sulfonation reagent at a lowered temperature for approximately 10–60 min, the temperature is thereafter raised, typically to room temperature, and the wash is continued for approximately 10–60 min. Thereafter the solvent is evaporated and the washing is continued for 1–3 h by using some other solvent, for example, THF, acetone or ethanol. The solvent is allowed to evaporate or the membrane is dried by means of heat and is transferred to water-vapor humidification in order to saturate the membrane gradually with water. Finally the membrane is washed with water.

The thickness of the non-aromatic sulfonated polymer membrane prepared by the process described above is approximately 5–200 $\mu$m, preferably approximately 30–60 $\mu$m. The total concentration of sulfonic acid groups in the membrane is 0.4–3.0, preferably 0.5–1.5 meq/g. The concentration of sulfonic acid groups in the middle of the membrane is at minimum 0.2 meq/g, preferably at minimum 0.4 meq/g. It is to be noted that in the membrane the ion exchange groups are linked directly to the linear carbon backbone of the polymer chain and not to the end of a side chain as in prior-known options.

A preferred application of the invention is an electrochemical cell, in particular a fuel cell. The electrochemical cell according to the invention comprises a first plate, a second plate placed at a distance, and at least one membrane-electrode assembly fitted between the first and the second plates. By an assembly is meant here a combination which comprises a first porous electrode, which is called a fuel electrode and which serves as the anode in the cell. At a distance from the first electrode there is located a second porous electrode, which is an oxidant electrode and which serves as the cathode in the cell. Between the first and the second electrodes there is fitted an ion-conducting electrolyte membrane. This membrane comprises a membrane according to the invention, Furthermore, each assembly has first feed units for the feeding fuel into the first electrode and second feed units for feeding an oxidant to the second electrode, and electric switching elements which enable switching between the first and the second electrodes.

The electrodes are interconnected by means of an external circuit in such a manner that there is a load (e.g. an electric motor) between them. The electric current in the external circuit is a stream of electrons, whereas it is ions that travel in the electrolyte, protons ($H^+$) in acid electrolytes and hydroxyl ions ($OH^-$) in alkaline ones. In the case of an acid electrolyte, the fuel cell works so that the fuel(typically hydrogen gas) arriving at the anode becomes ionized, producing ions and electrons. The electrons travel via the external circuit, and the ions travel via the proton-conducting electrolyte to the cathode. In the cathode reaction, on the other hand, the oxidant (typically oxygen gas) reacts with the ions which have traveled via the electrolyte and the electrons coming from the external circuit.

The invention is described below with the help of embodiment examples.

EXAMPLE 1
Solution Sulfonation

A polyvinyl fluoride film 30 μm thick is first irradiated with 2.36 MeV protons until the absorbed dose of the film is 400 kGy, which takes approximately 4 min for a 25 cm² film. Because of the method, the irradiation is carried out in vacuum. Thereafter the film is transferred to sulfonate in a dichloroethane solution, to which chlorosulfonic acid 1.0% by volume is added before the sulfonation. In addition, before the beginning of sulfonation, the solution is bubbled with an inert gas (e.g. $N_2$) to remove oxygen gas. The sulfonation is carried out at room temperature and for 60 min. After the sulfonation, the membrane is transferred to a 0° C. pure dichloroethane solution for a period of ½ hour, whereafter it is further transferred to a fresh dichloroethane solution, but at 21° C., for a period of ½ hour. Next, the membrane is removed from the solution, and the solvent is allowed to evaporate in a glove box for 10 min. Thereafter the membrane is transferred for a period of 2 h to tetrahydrofuran (THF). Finally the membrane is removed from the THF solution, the solvent is allowed to evaporate for 6 h in a draft cupboard and is transferred to distilled or ion-exchanged water until the membrane is taken into use.

In a membrane prepared according to the example, the total concentration of sulfonic acid groups is 0.8 meq/g and the concentration of sulfonic acid groups in the middle of the membrane is 0.4 meq/g.

EXAMPLE 2
Gas Sulfonation

A film according to Example 1 is irradiated in the same manner as described in the example. After the irradiation, the film is transferred to the sulfonation vessel. The sulfonation vessel is a pressure-resistant container at the bottom of which there has been added the required amount of oleum. After the film has been transferred to the sulfonation vessel, or alternatively before this, the sulfonation vessel is rinsed with an inert gas. During the sulfonation the pressure inside the vessel must be 1 kg/cm², and it is regulated with nitrogen gas. During the sulfonation the temperature in the sulfonation vessel must be 0° C., and the sulfonation is continued for 70 min. Finally the membrane is removed from the sulfonation vessel, is rinsed with nitrogen gas, is allowed to equilibrate with the air humidity for 4 h, and is transferred into water in accordance with Example 1.

EXAMPLE 3
Reference Example

In order to compare the invention with state-of-art technology, a process according to a journal article (Paronen, M., Sundholm, F., Rauhala, E., Lehtinen, T. and Hietala, S., Effects of Irradiation on Sulfonation of Poly (vinyl fluoride), *J. Mater. Chem.*, 1997, 7(12), 2401–2406) is described. A film according to Examples 1 and 2 is irradiated with 2.37 MeV protons, until the absorbed dose obtained is 400 kGy. The film is transferred immediately to a sulfonation solution. The sulfonation solution contains chlorosulfonic acid 2.5% by volume in dichloroethane. The sulfonation is continued for 5 hours. After the sulfonation, the membrane is washed with ion-exchanged water. The conductivity of the membrane thus prepared is 20.8 mS/cm and its ion exchange capacity is 3.1 meq/g. Owing to its insufficient mechanical strength the membrane could not be tested in a fuel cell.

EXAMPLE 4
Fuel Cell Test

The membrane according to Example 1 and a commercial membrane (Nafion 117) were tested in a fuel cell. The fuel cell test was performed at a temperature of 70° C. and under a gas pressure of 1 bar for 200 h. The polarization curves for the material according to Example 1 and for the commercial membrane are shown in FIG. 1. In the figure, the x-axis is the current density (A/cm²) and the y-axis is the voltage (V). It is seen from the figure that the performance of the material according to Example 1 is better than that of the commercial membrane. A calculation, on the basis of the figure, of the maximum capacity of the membrane according to the invention is at its best in the order of 0.16–0.18 W/cm², whereas the capacity of a commercial membrane per surface area unit is even at its best only 0.07–0.08 W/cm².

What is claimed is:

1. An electrochemical cell which comprises
   a first plate,
   a second plate placed at a distance from the first plate, and
   at least one membrane-electrode assembly fitted between the first and the second plates, the assembly comprising
      a first porous electrode,
      a second porous electrode placed at a distance from the first electrode,
      a membrane fitted between the first and the second electrode,
      first feeding units for feeding fuel to the first electrode,
      second feeding units for feeding an oxidant to the second electrode, and
      electric switching elements which enable electric switching between the first and the second electrode,
   characterized in that the membrane material of the membrane is a non-aromatic polymer film which comprises sulfonic acid groups linked directly to the linear carbon backbone of the polymer chain of the polymer in such a manner that the total concentration of sulfonic acid groups in the membrane is 0.4–3 meq/g and they are homogeneously distributed in the membrane material so that their concentration in the middle of the membrane is at minimum 0.2 meq/g.

* * * * *